June 10, 1969  J. W. EDGEMOND, JR., ETAL  3,448,770
HOT AIR TRANSFER VALVE WITH CONSTANT FLOW
AREA FOR ALL VALVE POSITIONS
Filed April 22, 1966

JOHN W. EDGEMOND JR.
JOHN L. BOYEN
INVENTORS.

BY

Townsend and Townsend

_United States Patent Office_ 3,448,770
Patented June 10, 1969

3,448,770
HOT AIR TRANSFER VALVE WITH CONSTANT FLOW AREA FOR ALL VALVE POSITIONS
John W. Edgemond, Jr., Oakland, and John L. Boyen, Orinda, Calif., assignors, by mesne assignments, to Vapor Corporation, Chicago, Ill., a corporation of Delaware
Filed Apr. 22, 1966, Ser. No. 544,511
Int. Cl. F16k *11/06, 27/04*
U.S. Cl. 137—610                                    8 Claims

ABSTRACT OF THE DISCLOSURE

A fluid valve suitable for industrial use in transferring large volumes of hot gases along alternate fluid flow paths wherein the valve has a plate provided with a pair of openings therethrough and a valve member rotatably mounted on the plate for movement relative to and in blocking relationship to said openings. The configuration of the plate and the openings are such that, for all positions of the valve member relative to the openings, the fluid pressure drop across the plate is essentially constant. Thus, the valve is suitable for use with equipment such as a turbine, or the like, where it is desired to avoid increases in back pressure.

---

This invention relates to improvements in fluid valves and, more particularly, to a valve for industrial use in transferring large volumes of hot gases along alternate fluid flow paths.

The present invention resides in a valve having a tubular housing provided with a plate across one of its ends. The plate has a pair of substantially identical fluid discharge openings therethrough in side by side relationship. A rotatable valve member in the housing is coupled with drive structure externally thereof whereby the valve member can be rotated into and out of any one of a number of operative positions controlling the flow of fluid through the openings.

The openings are substantially equal in size and configuration to each other and the valve member, in the form of a flat, plate-like blade or vane, is symmetrically located relative thereto so that the fluid pressure change across the plate always remains the same regardless of the operative position of the valve member relative to the openings. This is accomplished by judicious selection of the design and disposition of the valve member with respect to the openings such that the total area of the openings which is available as a discharge outlet as to a pressurized fluid within the housing remains substantially constant for all positions of the valve member. This constant area is equal to the area of each opening since the valve member can completely obstruct each opening while permitting the other opening to be fully unobstructed. The control of the valve member is provided by a power actuated device which, in turn, may be selectively actuated to effect the rotation of the valve member and thereby a change in the fluid flow through the openings.

The valve inherently has a "fail-safe" feature if it is properly oriented to the axis of rotation of the valve member. This allows a desired fluid flow condition to be established in the event that the valve actuating device fails and control of the valve member is lost. In addition, quick-release clamping rings may be utilized for coupling the valve to a fluid flow system. This feature is especially important in view of the size requirements of the valve and its openings and the fluid temperatures and pressures to which the valve is normally subjected.

In recovering heat energy from gas turbines operating as electrical or other power sources, the exhaust gases from such a turbine are relatively high temperatures and pressures requiring heavy duty ducting and control networks. It is oftentimes desired to provide alternate flow paths for these hot, pressurized gases, such as paths leading to several heat exchangers or paths leading to heat exchangers or to the atmosphere. Transition from one path to another or changes in the volume rate of flow of a fluid passing simultaneously along several paths must be made in an uninterrupted manner if structural damage to parts of the system is to be avoided. In particular, a back pressure developed at the fluid discharge outlet of a turbine, even for a relatively short time, may seriously affect its continued operation and have a restraining influence on the work output of the turbine. A problem therefore exists in changing the fluid path of discharge gases from a turbine or the like where such a change would inherently result in the developments of back pressure of the type described.

The present invention provides fluid flow control structure which can be used in systems which overcome the above-mentioned problem and allow it to be effectively used with turbines or other exhaust gas generating devices which are sensitive to back pressure developed at their fluid outlets. By keeping the effective area of the openings at a constant value regardless of the paths along which the fluid is to flow, the valve of this invention assures a uniform pressure drop across the openings. Thus, damage to the structural components of the system of which the valve is a part cannot occur due to pressure changes upon actuation of the valve itself. Continued operation of the system is thereby assured and the operational efficency is enhanced due to the minimum maintenance required by virtue of the pressure of the valve in the system.

It is therefore the primary object of this invention to provide a valve for controlling the flow of large volumes of hot gases along alternate fluid flow paths wherein changes in the volume rates of flow along the paths can be made while maintaining a substantially uniform fluid pressure difference across the valve to thereby eliminate any tendency for a back pressure to be developed at the outlet of the source of the gases.

Another object of the invention is the provision of a valve of the type described which is provided with a pair of fluid discharge openings and a rotatable valve member selectively obstructing the openings wherein the relative sizes and configurations of the openings and valve members are chosen to assure that the effective area of the openings available as a fluid discharge outlet remains substantially the same regardless of the operative position of the valve member with respect to the openings.

Still a further object of the present invention is to provide a heavy duty valve for controlling large volumes of hot pressurized gases and actuated by a prime mover wherein the valve itself is disposed to establish a predetermined fluid flow condition outwardly thereof in the event that the prime mover fails to operate properly. Thus, the valve has a "fail-safe" feature for purposes of safety of system operating personnel as well as for the structural components comprising the system.

Yet another object of the invention is the provision of a flexible mounting plate for the inlet duct coupled to the valve whereby linear expansion of the duct in response to the heat from the gases flowing therethrough may be permitted without resulting in structural damage to the valve or to components adjacent thereto.

Another object of the invention is to provide a valve of the aforesaid character having a cylindrical housing provided with perforate end plates defining the inlet and outlet openings thereof, the plates being releasably coupled to the housing by continuous clamping rings, whereby the valve despite its size and weight, can be readily installed in a fluid flow system which delivers large volumes of hot pressurized gases to several heat recovery units coupled by alternate fluid flow paths to the valve.

Other objects of this invention will become apparent as the specification progresses, reference being had to the accompanying drawing wherein.

Figure 1:
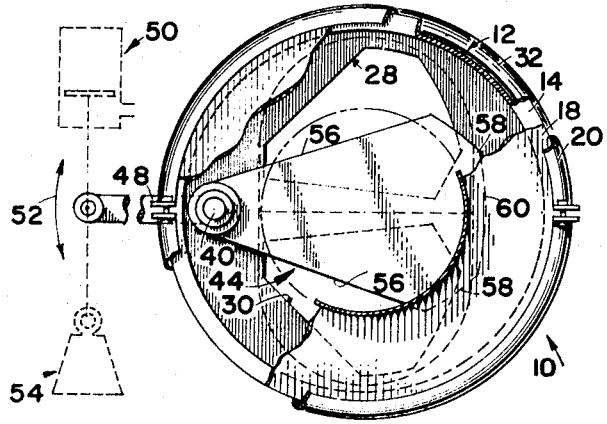
FIG. 1 is an end elevational view partly broken away of the valve illustrating the rotatable valve member thereof in a position intermediate the ends of its path of travel relative to the pair of discharge openings adjacent thereto.
Figure 4:
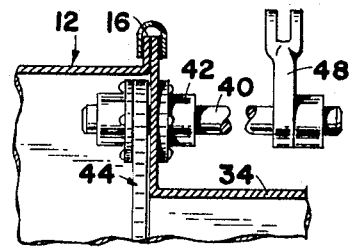
FIG. 4 is a cross sectional view taken along line 4—4 of FIG. 2.
Figure 2:
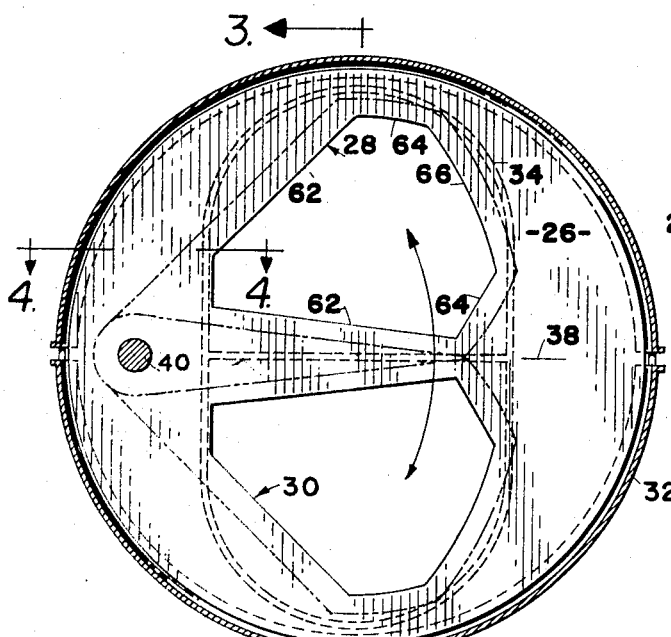
FIG. 2 is a vertical section of the valve taken along line 2—2 of FIG. 3.
Figure 3:
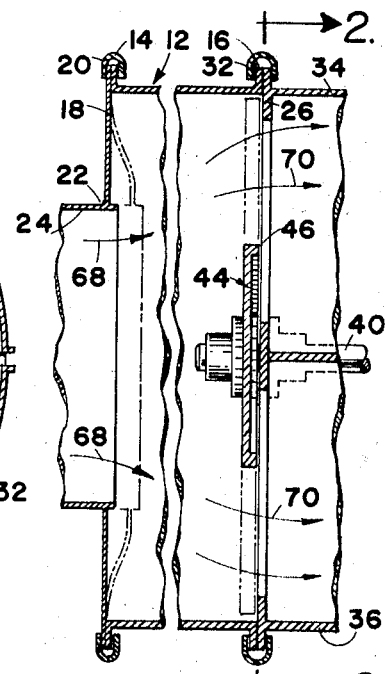
FIG. 3 is a cross sectional view taken along line 3—3 of FIG. 2.

A preferred form of the valve is illustrated in FIGS. 1–4 and is denoted by the numeral 10. Valve 10 includes a cylindrical housing 12 having a pair of open ends and continuous lateral flanges 14 and 16 surrounding the inlet and outlet ends thereof respectively as shown in FIG. 3. A flexible mounting plate 18 is secured by a continuous clamping ring 20 to flange 14 across the corresponding open end. Plate 18 has a central aperture 22 through which one end of a duct 24 is disposed. Duct 24 is secured in any suitable manner to plate 18 and has a predetermined coefficient of linear expansion which is significant since duct 24 is adapted to be coupled with a source of hot pressurized gases and to direct such gases into housing 12. The flexibility of plate 18 is provided to accommodate the linear changes of duct 24 and, as illustrated in FIG. 3 in dashed lines, plate 18 is displaced inwardly of its normal full line position to illustrate an increase in the length of duct 24 due to the thermal expansion thereof.

A plate 26 having a pair of substantially identical openings 28 and 30 therethrough is secured to flange 16 across the opposite end of housing 12 by continuous clamping ring 32. A pair of ducts 34 and 36 are rigidly connected to the outer ends of plate 26 in alignment with openings 28 and 30 respectively and define a pair of fluid flow paths leading outwardly from plate 26.

As shown in FIG. 2 openings 28 and 30 are substantially equal in size and have substantially the same configuration. Moreover, these openings are symmetrically located relative to the center line 38 of plate 26, line 38 being substantially perpendicular to the central axis of housing 12.

A shaft 40 extends through plate 26 in intersecting relationship to line 38 (FIG. 2) and is substantially parallel to the central axis of housing 12. A bearing 42 (FIG. 4) journals shaft 40 for axial rotation. A plate-like valve member 44 is rigid to and extends laterally from shaft 40 and has a configuration as shown in FIG. 1. Also, the configuration of valve member 44 is shown in dashed lines in FIG. 2.

Valve member 44 is in juxtaposition to the inner surface of plate 26 and is disposed to be moved into and out of any one of a number of operative positions obstructing either partially or totally the fluid flow outwardly of housing 12 through openings 28 and 30. Member 44 is provided with flange means 46 (FIG. 3) for sealing purposes when the same fully obstructs one of the openings 28 and 30.

An arm 48 is secured to shaft 40 outwardly of bearing 42 and is coupled in any suitable manner to a prime mover or power actuated device 50 shown schematically in FIG. 1. Device 50 operates to rotate arm 48 in opposed directions along an arcuate path denoted by arcuate arrow 52 whereby shaft 40 is rotated in opposite directions to, in turn, rotate valve member 44 with respect to openings 28 and 30. As shown, device 50 comprises a fluid actuated piston and cylinder assembly; however, other means of rotating shaft 40 may be provided.

Valve 10 may be provided with a "fail-safe" feature which is important in many applications for purposes of safety, in the event that failure of device 50 occurs. By porperly positioning the circumferential location of shaft 40 relative to a predetermined reference, valve member 44 can be caused to move to a predetermined disposition wherein it establishes a desired fluid flow condition through valve 10. As illustrated in FIG. 1, bias structure 54 in the nature of a counterweight is coupled to shaft 40 and, if device 50 were to fail, structure 54 would automatically swing valve member 44 into a position fully obstructing opening 28. In lieu of structure 54, valve member 44 would, under its own weight, move in the opposite direction upon failure of device 50, in which it would fully obstruct opening 30 rather than opening 28.

The configurations and dimensions of openings 28 and 30 and valve member 44 are such that, for all operative positions of member 44, substantially the same area of the openings is available as a discharge outlets for fluid passing into housing 12 through duct 24. This assures a uniform pressure difference across plate 26 so that a back pressure will not be developed in the duct and thereby the outlet of the source of the fluid. While other configurations may be utilized to accomplish this purpose, openings 28 and 30 and member 44 are basically trianguar in shape, although they are strictly polygonal as shown in FIGS. 1 and 2. Member 44 has a pair of side edges 56 which converge as shaft 40 is approached. It also has a pair of slightly arcuate edges 58 which interconnect edges 56 with an outermost edge 60.

Each of the openings 28 and 30 is defined by an inner, continuous periphery comprised of edges 62, 64 and 66 which correspond with edges 56, 58, and 60 of member 44 when the latter fully obstructs the opening. As shown in FIG. 2, the dimensions of member 44 are greater than either of openings 28 and 30 so that each opening will be effectively blocked or completely obstructed when member 44 is in either of the dashed line positions of FIG. 2. The arcuate edges 58 are alternately in relatively close proximity to the inner surface of housing 12 when member 44 is alternately in the dashed line positions of FIG. 2.

In operation, valve 10 is mounted in a fluid flow line by releasably securing housing 12 to plates 18 and 26 by the use of rings 20 and 32. Shaft 40 is coupled to device 50 and the structure 54 prior to establishing fluid flow through pipe 24 and in the direction of arrows 68 (FIG. 3).

Device 50 is actuated to locate member 44 in a predetermined position to establish a particular fluid flow condition outwardly of housing 12. The fluid flow is then commenced and the fluid passes into either or both of the ducts 34 and 36 depending upon the position of member 44. For instance, in the intermediate position of FIG. 1, fluid flop through openings 28 and 30 is substantially the same, the fluid flow being directed along lines indicated by arrows 70 (FIG. 3).

Figure 5:
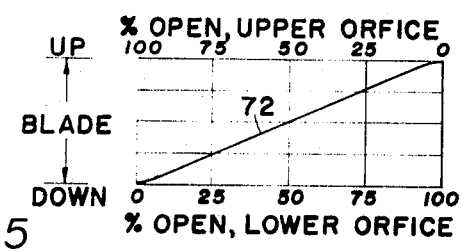
FIG. 5 is a graphical illustration of the operating characteristics of the valve to show the uniformity in the pressure difference across the valve for substantially all operative positions of the valve member.

A characteristic curve 72 of valve 10 is illustrated in FIG. 5, wherein the ordinate represents the positions of member 44 between the ends of its path of travel and the abscissa represents the percentage by which the opening 28 and 30 are obstructed when member 44 is in its various operative positions. Curve 72 is linear for substantially all positions of member 44. Thus, the sum of the areas of openings 28 and 30 which are available as fluid outlets is substantially at all times equal to the sum of the total area of one of the openings. As mentioned above, this is extremely advantageous because of the uniformity of the pressure difference or pressure drop across plate 26. Thus, changes in the position of member 44 can be made without developing a back pressure in the fluid flow defined by duct 24.

Valve 10 is simple and rugged in construction and can be readily installed in and removed from a fluid flow system which transfers large volumes of hot gases from a source which is sensitive to back pressure build-up at its fluid outlet. Quick-release fasteners 74 are provided with rings 20 and 32 to readily connect valve 10 into a fluid line.

While one embodiment of this invention has been shown and described, it will be apparent that other adaptations and modifications can be made without departing from the true spirit and scope of the invention.

What is claimed is:

1. A fluid valve comprising: a support having a pair of spaced openings therethrough and adapted to be coupled to a fluid flow system with said openings disposed across the path of fluid flow, the effective area of one opening being substantially the same as the effective area of the other opening; a valve member; means mounting the valve member on the support for rotational movement with respect thereto between a first position with said valve member closing said one opening and permitting the other opening to be fully unobstructed and a second position with said valve member closing the other opening and permitting said one opening to be fully unobstructed; and means coupled with said valve member for selectively rotating the same into and out of either of said first and second positions or any one of a number of operative positions intermediate said first and second positions, said openings being partially obstructed when the valve member is in each of said intermediate positions, the sum of the effective areas of the unobstructed portions of said openings when said valve member is in each of said intermediate positions being substantially equal to the total area of each opening.

2. A fluid valve comprising: a support having a pair of spaced openings therethrough and adapted to be coupled to a fluid flow system with said openings disposed across the path of fluid flow, said openings having substantially equal effective areas; a valve member rotatably mounted on said support and being movable with respect to said openings into and out of any one of a number of operative positions including a first position closing one of the openings and permitting the other opening to be fully unobstructed, a second position closing the other opening and permitting said one opening to be fully unobstructed, and a number of positions intermediate said first and second positions, the openings being partially obstructed when the valve member is in each of said intermediate positions, said valve member being disposed when it is in each intermediate position to effect a fluid pressure change across said support substantially equal to the fluid pressure change across the support when the valve member is in each of said first and second positions; and means coupled with said valve member for selectively rotating the same into and out of each of said positions.

3. A fluid valve comprising: a housing having a pair of spaced, open ends, a duct adapted to be coupled to a source of fluid under pressure; means mounting said duct on one end of said housing in fluid communication with the interior thereof; a plate secured to said housing across the other end thereof, said plate having a pair of spaced openings therethrough, said openings having substantially equal effective areas; a valve member rotatably mounted on said plate in juxtaposition with and movable along one face thereof, said valve member being shiftable into and out of any one of a number of operative positions including a first position closing one of the openings and permitting the other opening to be fully unobstructed, a second position closing the other opening and permitting said one opening to be fully unobstructed, and a number of positions intermediate said first and second positions, the openings being partially obstructed when the valve member is in each of said intermediate positions, the sum of the effective areas of the unobstructed portions of said openings when said valve member is in each of said intermediate positions being substantially equal to the total area of each opening; and means coupled with said valve member for selectively rotating the same in opposed directions.

4. A fluid valve as set forth in claim 3, wherein said duct mounting means includes a flexible plate having an aperture therethrough, said duct being coupled to said plate in alignment with said aperture, a portion of said plate being displaceable relative to the housing upon axial movement of said duct in response to thermal expansion thereof.

5. A fluid valve as set forth in claim 3, wherein said housing is cylindrical and has a continuous, lateral flange for each end thereof respectively, said duct mounting means including a plate, said plates having circular outer peripheries, and a clamping ring for each plate respectively, the clamping rings releasably securing respective flanges of said housing.

6. A fluid valve as set forth in claim 3, wherein is included a shaft journalled on, extending through and freely rotatable relative to said plate, said valve member being rigidly connected to said shaft for rotation therewith, said rotating means including a power device coupled to said shaft for rotating the same in opposed directions, said shaft being disposed in a predetermined location with respect to said openings to permit said valve member to move to a disposition establishing a preselected fluid flow condition relative to said openings in the event that said power devices becomes inoperative.

7. A fluid valve as set forth in claim 3, wherein each opening is generally triangular, said valve member having a major portion substantially complemental to said openings.

8. A fluid valve as set forth in claim 7, wherein is provided a shaft mounted on said plate for rotation relative thereto, each opening having a pair of edges which are generally convergent as said shaft is approached, said opening being simultaneously disposed on opposite sides of a plane passing axially through said shaft and disposed perpendicular to said plate.

References Cited

UNITED STATES PATENTS

| | | | |
|---|---|---|---|
| 858,100 | 6/1907 | Pederson | 285—187 |
| 2,273,720 | 2/1942 | Morrow | 302—28 |
| 2,696,220 | 12/1954 | Dikeman | 137—609 X |
| 2,772,695 | 12/1956 | Harrison | 137—607 X |
| 2,809,584 | 10/1957 | Smith | 285—407 X |
| 3,140,741 | 7/1964 | Keating et al. | 137—607 X |
| 3,151,894 | 10/1964 | Wilson et al. | 285—224 X |
| 3,174,709 | 3/1965 | Alderson | 137—610 |
| 3,246,917 | 4/1966 | Martin | 285—187 X |

FOREIGN PATENTS 534,453 12/1956 Canada.

ALAN COHAN, *Primary Examiner.*

DENNIS H. LAMBERT, *Assistant Examiner.*

U.S. Cl. X.R.

251—304; 285—224